United States Patent [19]

Telesio

[11] 4,071,950
[45] Feb. 7, 1978

[54] SCORING TOOL FOR FRANKFURTERS

[76] Inventor: George O. Telesio, 3760 Hermosa Place, Fullerton, Calif. 92635

[21] Appl. No.: 741,064

[22] Filed: Nov. 11, 1976

[51] Int. Cl.² .............................................. A22C 9/00
[52] U.S. Cl. ........................................... 30/124; 17/25
[58] Field of Search .................. 30/124, 164.9, 294, 30/299; 17/25

[56] References Cited

U.S. PATENT DOCUMENTS

| | | | |
|---|---|---|---|
| 2,520,000 | 8/1950 | Dettman | 30/124 X |
| 2,810,416 | 10/1957 | Russell | 30/124 X |
| 3,999,293 | 12/1976 | Zubrycki | 30/124 |

Primary Examiner—Jimmy C. Peters
Attorney, Agent, or Firm—Christie, Parker & Hale

[57] ABSTRACT

A tool for scoring the skin of a frankfurter, or the like, consisting of a flat metal plate with a pair of spaced parallel downturned edges and a handle on top. Cutters are attached to the underside of the plate so that the frankfurter can be rolled between the plate and a flat surface and scored by the cutter. In one form the plate is elongated and the turndown edges are angled so that when one of the turndown edges is aligned with the side of the frankfurter, as the frankfurter is rolled under the tool, the tool defines a helical path on the surface of the frankfurter.

8 Claims, 7 Drawing Figures

U.S. Patent  Feb. 7, 1978  4,071,950
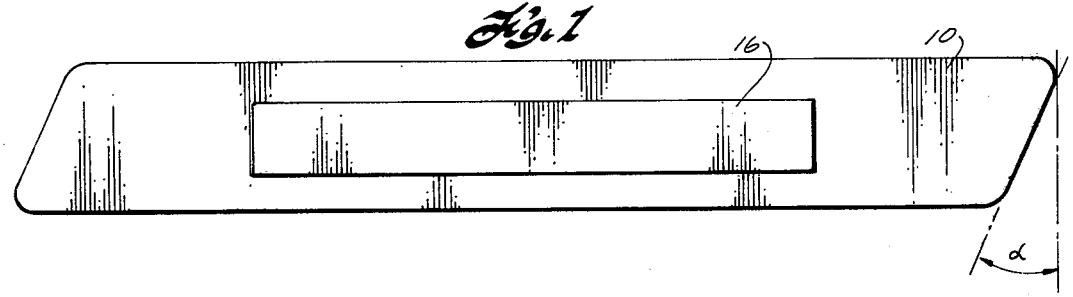
Fig. 1
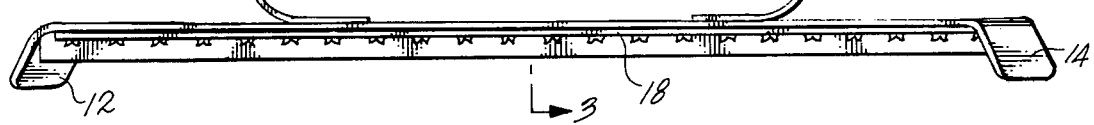
Fig. 2
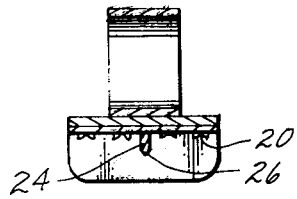
Fig. 3
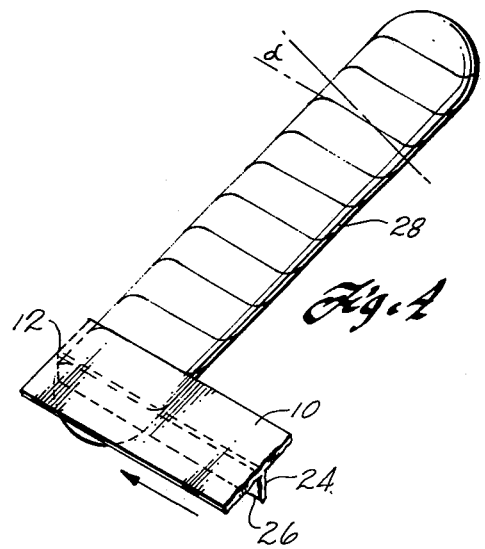
Fig. 4
Fig. 7
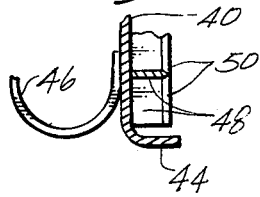
Fig. 6
Fig. 5

SCORING TOOL FOR FRANKFURTERS

FIELD OF THE INVENTION

This invention relates to a scoring tool for frankfurters or the like.

BACKGROUND OF THE INVENTION

It is well known that when frankfurters, hot dogs, or other types of sausage having an outer skin are heated, steam and juices inside the skin cause it to swell and eventually rupture. In the process, the shape of the frankfurter becomes distorted and the frankfurter becomes bent out of its normal straight elongated shape. While it has been known to slit or score the surface of the skin of the hot dog with a knife or other cutting implement, conventional knives or other implements for this purpose are cumbersome to use.

SUMMARY OF THE INVENTION

The present invention is directed to an improved implement or utensil for scoring or cutting the surface of a frankfurter or the like prior to cooking. The utensil is simple in its construction and easy to use, yet is effective and fast in operation. In brief, the utensil comprises a flat metal plate from which project knive edges. A handle is attached to the opposite side of the plate enabling the utensil to be placed on top of a frankfurter lying on a flat cutting surface. By rolling the frankfurter between the plate and the supporting surface, the surface of the frankfurter is scored by the cutting edges. In one form of the invention, the plate is substantially rectangular in shape with opposite edges turned down to form spaced lips. The distance between the downturned lips is approximately equal to the circumference of the frankfurter. By placing one lip against the frankfurter and rolling the plate until the opposite lip engages the frankfurter, the frankfurter is rolled through one complete revolution, causing it to be scored completely around. In an alternative embodiment the plate is elongated and the ends are turned down in a pair of spaced lips which extend at an angle to the longitudinal axis of the plate. By placing one lip against the frankfurter, the plate extends lengthwise at an obtuse angle to the axis of the frankfurter so that as the frankfurter is rolled beneath the plate the point of contact at the center of the plate follows a helical path around the surface of the frankfurter extending from one end to the other.

DESCRIPTION OF THE DRAWINGS

For a better understanding of the invention, reference should be made to the accompanying drawings, wherein:

FIG. 1 is a plan view of one embodiment of the present invention;

FIg. 2 is a side view of the same embodiment;

FIG. 3 is a sectional view taken substantially on the line 3—3 of FIG. 2.;

FIG. 4 shows a frankfurter that has been scored using the utensile shown in the embodiments of FIGS. 1-3;

FIG. 5 is a plan view of an alternate embodiment of the invention;

FIG. 6 is a fragmentary sectional view taken substantially on the line 6—6 of FIG. 5; and FIG. 7 shows a frankfurter scored using the tool of the embodiment of FIGS. 5 and 6.

DETAILED DESCRIPTION

Referring to the embodiment shown in FIGS. 1-4, the numeral 10 indicates generally a flat metal plate which is in the shape of an elongated rhomboid. The ends of the plate 10 are turned down to form lips 12 and 14 which extend at an oblique angle to the longitudinal axis of the plate 10. A handle 16 in the form of a metal loop is attached to the top side of the plate 10. The underside of the plate 10 is provided with a sheet metal cutter 18 which is dimpled to form a plurality of projecting cutting edges 20. In addition, an elongated cutter blade 24 in the form of a thin band projects downwardly from the underside of the plate 10 and terminates in a projecting knife edge 26 which extends the length of the plate 10 between the downturn lips 12 and 14.

Operation of the utensil can best be understood by reference to FIG. 4. A frankfurter 28 is placed on a smooth horizontal surface, such as a table top, and the utensil is placed on top of the frankfurter adjacent one end with the lip 12 in contact with the margin or outer surface of the frankfurter. When so positioned because the lip is formed at an oblique angle $\alpha$ to the longitudinal axis of the plate 10, the knife edge 26 of the cutter 24 extends at the same oblique angle relative to the longitudinal axis of the frankfurter. By rolling the frankfurter between the flat surface and the underside of the plate 10, the cutter 24 makes a helical cut on the outer surface of the frankfurter 28. The length of the surface 10 between the lips 12 and 14 is made approximately equal to the length of the helical cut so that as the plate 10 is rolled against the surface of the frankfurter, longitudinal movement of the plate over the full length between the lips 12 and 14 advances the helical cut the full length of the frankfurter. It will be noted that the angle $\alpha$ corresponds to the pitch of the helical cut formed by the utensil. The projecting cutters 20 score the skin of the frankfurter and provided good frictional engagement between the plate 10 and the surface of the frankfurter. Thus it will be seen that a single lengthwise pass of the utensil in rolling contact with the surface of the frankfurter scores and cuts the full length of the frankfurter.

An alternative embodiment is shown in FIGS. 5-7. In this form of the utensil a flat metal plate 40 is made substantially rectangular in shape with the longitudinal dimension being equal to or greater than the length of the frankfurter and the width being substantially equal to or greater than the circumference of the frankfurter. The longitudinal edges terminate in downturned lips 42 and 44. A handle 46 is attached to the top side of the plate 40. A plurality of cutters 48 extend diagonally in a diamond pattern on the under surface of the plate 40. The cutters 48 are formed of thin straight bands of steel or the like projecting substantially perpendicularly from the underside of the plate 40 and terminating in knife edges 50.

In operation, a frankfurter 52 is placed on a flat horizontal surface and the utensil of FIGS. 5-7 is placed on top of the frankfurter with the frankfurter extending parallel to the lips 42 and 44. The knife edges 50 cut through the outer skin of the frankfurter. As the frankfurter is rolled back and forth between the lips 42 and 44, the entire outer surface of the frankfurter is scored in a diamond pattern by the cutters 48, in the manner shown in FIG. 7.

From the above description it will be seen that a utensil is provided which when used to roll a frankfurter against a flat surface scores the outer skin of the frankfurter with a single pass of the utensil. Thus the utensil provides a fast, efficient means of effectively cutting through the outer surface of a frankfurter before it is cooked, thereby preventing the frankfurter from becoming bent and distorted during the cooking operation.

I claim:

1. A tool for scoring the skin of a frankfurter or the like comprising: a flat plate having a pair of spaced parallel turned down edges spaced a distance at least substantially equal to the circumference of a frankfurter and the like, cutter means secured to and projecting from the surface of the plate and extending between said pair of edges, and handle means attached to the opposite side of the plate from the cutter means.

2. The tool of claim 1 wherein the cutter means comprises at least one metal band sharpened along one longitudinal edge and secured to the surface of the plate along the other longitudinal edge, the band projecting substantially perpendicularly to said plate.

3. The tool of claim 1 wherein the plate is rectangular in shape with the distance between the turned down edges being substantially equal to the circumference of the frankfurter and the distance between the other two edges is substantially equal to the length of a frankfurter.

4. The tool of claim 3 wherein the cutter means extends diagonally across the surface of the plate in a diamond pattern.

5. The tool of claim 1 wherein the plate is elongated in the direction between the downturned edges.

6. The tool of claim 5 wherein the plate is in the shape of a rhomboid.

7. The tool of claim 5 wherein the cutter means includes a band extending lengthwise of the plate between the downturned edges.

8. The tool of claim 7 wherein the cutter means further includes a plurality of projecting points on either side of the band for scoring the surface of a frankfurter.

* * * * *